US011174171B2

(12) United States Patent
Geng et al.

(10) Patent No.: US 11,174,171 B2
(45) Date of Patent: Nov. 16, 2021

(54) HIERARCHICAL POROUS HONEYCOMBED NICKEL OXIDE MICROSPHERE AND PREPARATION METHOD THEREOF

(71) Applicant: Northwestern Polytechnical University, Shaanxi (CN)

(72) Inventors: Wangchang Geng, Shaanxi (CN); Shilu Xu, Shaanxi (CN); Yi Yan, Shaanxi (CN); Qiuyu Zhang, Shaanxi (CN)

(73) Assignee: Northwestern Polytechnical University, Shaanxi (CN)

( * ) Notice: Subject to any disclaimer, the term of this patent is extended or adjusted under 35 U.S.C. 154(b) by 0 days.

(21) Appl. No.: 17/148,783

(22) Filed: Jan. 14, 2021

(65) Prior Publication Data
US 2021/0276883 A1    Sep. 9, 2021

(30) Foreign Application Priority Data
Mar. 5, 2020    (CN) .......................... 202010147362.9

(51) Int. Cl.
*C01G 53/04*    (2006.01)
(52) U.S. Cl.
CPC .......... *C01G 53/04* (2013.01); *C01P 2002/72* (2013.01); *C01P 2004/03* (2013.01); *C01P 2004/34* (2013.01); *C01P 2004/61* (2013.01); *C01P 2006/12* (2013.01); *C01P 2006/17* (2013.01)

(58) Field of Classification Search
CPC ....................................................... C01G 53/04
See application file for complete search history.

(56) References Cited

FOREIGN PATENT DOCUMENTS

CN    103943379 A    7/2014

OTHER PUBLICATIONS

Ren et al. "Facile Synthesis of Hierachical Mesoporous Honeycomb-like NiO for Aqueous Asymmetric Supercapacitors" ACS Applied Materials & Interfaces, Research Article, www.acsami.org, Published Aug. 24, 2015, DOI: 10.1021/acsami.5b04094, 11 pages.
The State Intellectual Property Office of People's Republic of China, Application No. 202010147362.9, Second Office Action, dated Mar. 15, 2021, 3 pages English Translation, 5 pages.
The State Intellectual Property Office of People's Republic of China, First Office Action, Application No. 202010147362.9, dated Oct. 30, 2020, 4 pages. English Translation, 7 pages.
The State Intellectual Property Office of People's Republic of China, Notification to Grant, Application No. 202010147362.9, dated Apr. 1, 2021, 3 pages. English Translation, 2 pages.

*Primary Examiner* — James A Fiorito
(74) *Attorney, Agent, or Firm* — Ziegler IP Law Group, LLC

(57) ABSTRACT

A hierarchical porous honeycombed nickel oxide microsphere and a preparation method thereof are disclosed. The method includes mixing nickel sulfate hexahydrate, urea, water and glycerol, to obtain a mixed solution; subjecting the mixed solution to a hydrothermal reaction, to obtain a precursor; and calcining the precursor, to obtain the hierarchical porous honeycombed nickel oxide microspheres.

5 Claims, 3 Drawing Sheets

HIERARCHICAL POROUS HONEYCOMBED NICKEL OXIDE MICROSPHERE AND PREPARATION METHOD THEREOF

CROSS REFERENCE TO RELATED APPLICATION

The application claims priority to Chinese Application No. 202010147362.9, filed on Mar. 5, 2020, entitled "hierarchical porous honeycombed nickel oxide microsphere and preparation method thereof", which is hereby incorporated by reference in its entirety.

TECHNICAL FIELD

The present disclosure relates to the technical field of the preparation of micro-nano materials, in particular to a hierarchical porous honeycombed nickel oxide microsphere and a preparation method thereof.

BACKGROUND

Stoichiometric nickel oxide is a good insulator. However, oxygen is always excessive in practice. Nickel oxide usually exhibits as a p-type semiconductor with a band gap energy of 3.6 to 4.0 eV. Due to its advantages such as a high natural abundance, low toxicity, low environmental impact and great stability, nickel oxide has received a lot of attentions over recent years. For example, due to their high specific capacitance and low resistance, nickel oxide nanostructured materials are used as electrode materials to manufacture supercapacitors with a high energy and a high power; moreover, due to their high-speed, low-voltage, high-stability and reliable-storage characteristics, nickel oxide nanostructured materials also become promising materials for making resistive random access memory.

The morphology and structure of the material have a very important influence on its performance. The porous microsphere structure has characteristics such as a larger specific surface area and a better stability, so the related materials have important application prospects in various fields such as energy, catalysis, drug carriers, and gas sensing. Generally, the methods for synthesizing mesoporous nickel oxide mainly include silica hard template method, carbon hard template method, etc., but these methods involve relatively cumbersome process and multi-step processing, have a high energy consumption and a high cost, and is easy to pollute environment; moreover, the currently reported microspherical nickel oxides generally have defects such as easy to agglomerate and difficult to control the size. Furthermore, it is a great challenge to control the morphology and simultaneously to make the microsphere particle size and mesoporous pore size controllable. Based on this, it is very important to develop a porous-structured nickel oxide microsphere with a good monodispersity, a controllable microsphere particle size and mesoporous size.

SUMMARY

In view of this, an objective of the present disclosure is to provide a hierarchical porous honeycombed nickel oxide microsphere and a preparation method thereof. A simple hydrothermal reaction with glycerol of the present disclosure makes it possible to synthesize a hierarchical porous honeycombed nickel oxide microsphere with a larger specific surface area, thereby realizing the control of microsphere size and porous pore size distribution.

In order to achieve the above objectives, the present disclosure provides the following technical solutions:

The present disclosure provides a method for preparing a hierarchical porous honeycombed nickel oxide microsphere, comprising, mixing nickel sulfate hexahydrate, urea, water and glycerol, to obtain a mixed solution;

subjecting the mixed solution to a hydrothermal reaction, to obtain a precursor; and calcining the precursor, to obtain the hierarchical porous honeycombed nickel oxide microspheres.

In some embodiments, a mass ratio of nickel sulfate hexahydrate to urea is in a range of (0.24-0.28):(0.06-0.60).

In some embodiments, a volume ratio of glycerol to water is in a range of (0-18):(36-18).

In some embodiments, a volume ratio of glycerol to water is 1:35, 1:5, 1:2 or 1:1.

In some embodiments, a ratio of the total solid mass of nickel sulfate hexahydrate and urea to the total liquid volume of glycerol and water is in a range of 1 g:(40-110) mL.

In some embodiments, the hydrothermal reaction is performed at a temperature of 135-140° C. for 40-80 minutes.

In some embodiments, the calcining of the precursor is performed at a temperature of 400-450° C. for 20-24 hours.

In some embodiments, the method further comprises subjecting a product obtained after the hydrothermal reaction to a filtering, a washing and a drying in sequence.

In some embodiments, the mixing of nickel sulfate hexahydrate, urea, water and glycerol is performed at a temperature of 15-35° C.

The present disclosure further provides a hierarchical porous honeycombed nickel oxide microsphere, as prepared by the method as described in the above technical solutions, wherein the hierarchical porous honeycombed nickel oxide microsphere has an adjustable particle size in a range of 1.5-5 μm, a mesoporous pore size of 3-6 nm, a macropore pore size of 20-80 nm, and a specific surface area of 94.8-135.6 $m^2$/g. As used therein, "particle size" of the hierarchical porous honeycombed nickel oxide microsphere is measure by scanning electron microscope (SEM) analysis.

The present disclosure provides a method for preparing a hierarchical porous honeycombed nickel oxide microsphere material, comprising the following steps: mixing nickel sulfate hexahydrate, urea, water and glycerol (glycerin) to obtain a mixed solution; subjecting the mixed solution to a hydrothermal reaction, to obtain a precursor; and calcining the precursor, to obtain the hierarchical porous honeycombed nickel oxide microspheres. During the hydrothermal reaction of the present disclosure, at the first stage of the growth process, glycerol is coordinated with $Ni^{2+}$ of the reaction system, to form a coordination compound, and the coordination compound reacts with $CO_3^{2-}$ and $OH^-$, which are formed by the hydrolysis of urea, to form a primary nucleus. At the second stage of the growth process, the original primary nucleus is adsorbed by the chelating agent of glycerin and nickel, which acts as an end-capping reagent to adjust the morphology by reducing the surface energy, thereby finally transforming the nucleus into a highly symmetrical flower-like structure. Meanwhile, in the urea-glycerol mixture system, since the non-surfactant organic small molecule glycerol template used contains more hydroxyl groups, glycerol first aggregates by hydrogen bond action, then interacts with the inorganic-phase hydroxyl groups from the hydrolysis of urea via hydrogen bond(s) to form a mesoporous structure, and finally the precursor with the mesoporous structure is calcined to obtain a hierarchical porous honeycombed nickel oxide microsphere. In addition, in the method of the present disclosure, no surfactants is used, and no adjustment of the pH value is required, which simplifies the reactions, and reduces production costs. By simply adjusting the amount of the solvent component glycerin, it is possible to obtain a honeycombed microsphere with a uniform size distribution, a good monodispersity, and with a controllable particle size in a range of 1.5-5 μm. It can be seen from the results of the examples that the hierarchical porous honeycombed nickel oxide microspheres as prepared in the present disclosure have an obvious mesoporous structure, a microsphere particle size of 1.5-5 μm, a mesoporous pore size of 3-6 nm, and a macroporous pore size of 20-80 nm, and a specific surface area of 94.8-135.6 m²/g, thereby having a higher specific surface area, more active sites, and no agglomerations, so they show excellent performances in the fields of catalysis, sensing, adsorption, etc.

Further, the hydrothermal reaction in the present disclosure is performed at a lower temperature for a shorter period of time, thereby improving production efficiency and saving production energy.

DETAILED DESCRIPTION OF THE EMBODIMENTS

Figure 1:
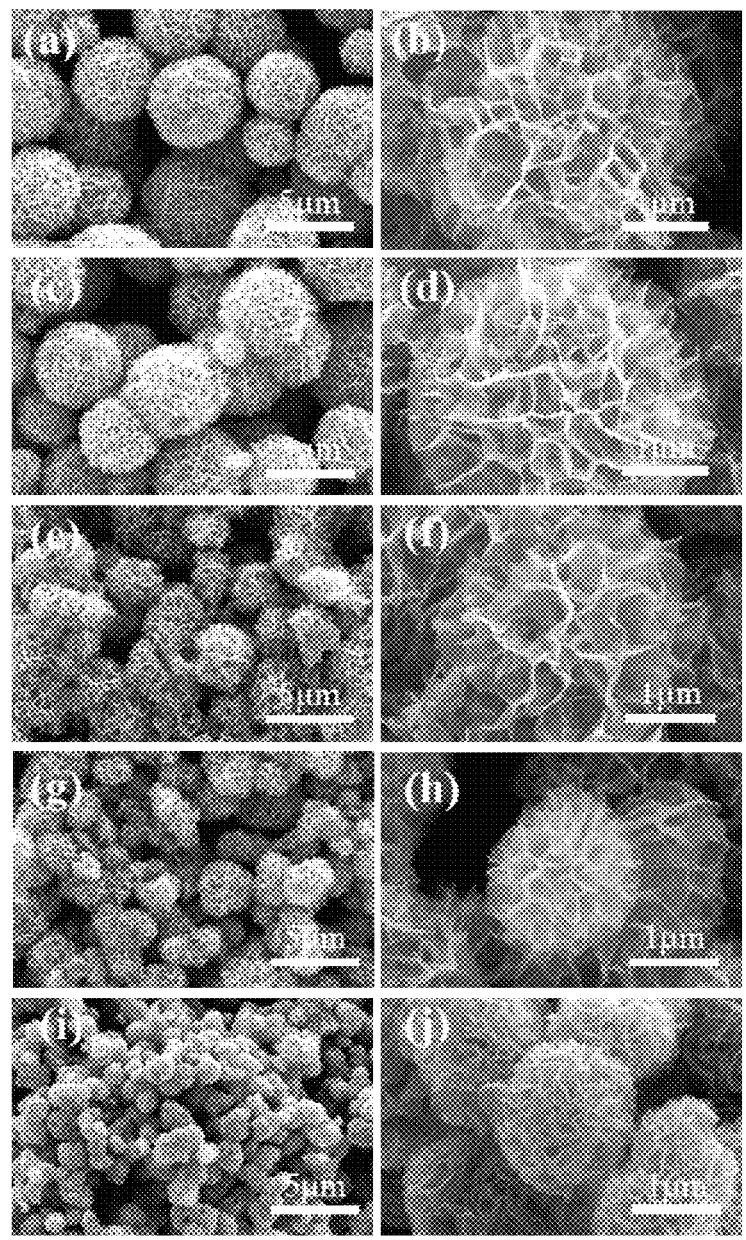
FIG. 1 shows scanning electron microscope (SEM) images of the porous honeycombed nickel oxide microspheres as prepared in Examples 1 to 5, in which, (a) and (b) show SEM images of the porous honeycombed nickel oxide microspheres as prepared in Example 1 at different magnifications, (c) and (d) show SEM images of the porous honeycombed nickel oxide microspheres as prepared in Example 2 at different magnifications, (e) and (f) show SEM images of the porous honeycombed nickel oxide microspheres as prepared in Example 3 at different magnifications, (g) and (h) show SEM images of the porous honeycombed nickel oxide microspheres as prepared in Example 4 at different magnifications, (i) and (j) show SEM images of the porous honeycombed nickel oxide microspheres as prepared in Example 5 at different magnifications.

The present disclosure provides a method for preparing a hierarchical porous honeycombed nickel oxide microsphere, comprising the following steps:

mixing nickel sulfate hexahydrate, urea, water and glycerol, to obtain a mixed solution;

subjecting the mixed solution to a hydrothermal reaction, to obtain a precursor;

calcining the precursor, to obtain the hierarchical porous honeycombed nickel oxide microsphere.

In the present disclosure, nickel sulfate hexahydrate, urea, water and glycerol are mixed, to obtain a mixed solution.

In some embodiments of the present disclosure, a mass ratio of nickel sulfate hexahydrate to urea is in a range of (0.24-0.28):(0.06-0.60), more preferably in a range of (0.25-0.26):(0.48-0.60).

In some embodiments of the present disclosure, a volume ratio of glycerol and water is in a range of (0-18):(36-18), more preferably 1:35, 1:5, 1:2 or 1:1.

In some embodiments of the present disclosure, a ratio of the total solid mass of nickel sulfate hexahydrate and urea to the total liquid volume of glycerol and water is in a range of 1 g:(40-110) mL.

In some embodiments of the present disclosure, the mixing of nickel sulfate hexahydrate, urea, water and glycerol is performed at a temperature of 15-35° C., more preferably 20-25° C. In some specific embodiments of the present disclosure, the mixing of nickel sulfate hexahydrate, urea, water and glycerol is performed by mixing nickel sulfate and urea in deionized water, then adding glycerol, and stirring them, to obtain the mixed solution.

After the mixed solution is obtained, in the present disclosure, the mixed solution is subjected to a hydrothermal reaction, to obtain a precursor. In some embodiments of the present disclosure, the hydrothermal reaction is performed at a temperature of 135-140° C., more preferably 140° C. In some embodiments, the hydrothermal reaction is performed for 40-80 minutes, more preferably 60 minutes. During the hydrothermal reaction of the present disclosure, at the first stage of the growth process, glycerol is coordinated with $Ni^{2+}$ in the reaction system, to form a coordination compound, and the coordination compound reacts with $CO_3^{2-}$ and $OH^-$, which are formed by the hydrolysis of urea, to form a primary nucleus. At the second stage of the growth process, the original primary nucleus is adsorbed by the chelating agent of glycerin and nickel, which acts as an end-capping reagent to adjust the morphology by reducing the surface energy, thereby finally forming a highly symmetrical flower-like structure. Meanwhile, in the urea-glycerol mixture system, since the non-surfactant organic small molecule-glycerol template used contains more hydroxyl groups, glycerol first aggregates by hydrogen bond action, and interacts with the inorganic-phase hydroxyl groups from the hydrolysis of urea via hydrogen bond(s) to form a mesoporous structure.

In some embodiments of the present disclosure, the method further comprises subjecting a product obtained after the hydrothermal reaction in sequence to a filtering, a washing and a drying. In the present disclosure, there is no particular limitations to the operations of the filtering and the washing, and the operations of the filtering and the washing well known in the art may be used. In some embodiments of the present disclosure, the drying is performed at a temperature of 60° C. for 12 hours.

After obtaining the precursor, the precursor is calcined, to obtain the hierarchical porous honeycombed nickel oxide microspheres.

In some embodiments of the present disclosure, the calcining of the precursor is performed at a temperature of 400-450° C., more preferably 400° C. In some embodiments, the calcining of the precursor is performed for 20-24 hours, more preferably 20 hours.

In some embodiments of the present disclosure, the temperature is increased to the calcination temperature at a rate of 1-2° C./min.

In some embodiments of the present disclosure, the precursor is calcined in air atmosphere to obtain the hierarchical porous honeycombed nickel oxide microsphere.

The present disclosure also provides a hierarchical porous honeycombed nickel oxide microsphere as prepared by the method as described in the above technical solutions. The hierarchical porous honeycombed nickel oxide microsphere has a controllable particle size in a range of 1.5-5 µm, a mesopore pore size of 3-6 nm, a macropore pore size of 20-80 nm, and a specific surface area of 94.8-135.6 m$^2$/g.

In order to further illustrate the present disclosure, the hierarchical porous honeycombed nickel oxide microsphere and the preparation method thereof provided by the present disclosure will be described in detail below in conjunction with examples, but they should not be understood as limiting the protection scope of the present disclosure.

Example 1

0.263 g of nickel sulfate hexahydrate was dissolved in 36 mL of deionized water at ambient temperature, to obtain a green clear solution, then 0.48 g of urea was added into the above solution, and they were stirred to be uniform. The resulting mixture was transferred to a stainless steel autoclave lined with polytetrafluoroethylene, and subjected to a hydrothermal reaction at 140° C. for 1 hour. After the hydrothermal reaction was completed, the mixture was cooled to ambient temperature, centrifuged to collect a green crude product. The green crude product was washed with deionized water and absolute ethanol for three times each, and dried in an oven at 60° C. for 12 hours to obtain a green product (i.e. the precursor). In order to remove the residual intermediate products, the green product sample was calcined in a tube furnace at 400° C. for 20 hours, and hierarchical porous honeycombed nickel oxide microspheres were collected, labeled as NiO-1, with a specific surface area of 131.1 m$^2$/g.

Example 2

0.263 g nickel sulfate hexahydrate was dissolved in 35 mL of deionized water at ambient temperature, to obtain a green clear solution, then 0.48 g of urea was added to the above solution, 1 mL of glycerol was added, and they were stirred to be uniform. The resulting mixture was transferred to a stainless steel autoclave lined with polytetrafluoroethylene, and subjected to a hydrothermal reaction at 140° C. for 1 hour. After the hydrothermal reaction was completed, the mixture was cooled to ambient temperature, and centrifuged to collect a green crude product. The green crude product was washed with deionized water and absolute ethanol for three times each, and dried in an oven at 60° C. for 12 hours to obtain a green product. The green product was calcined in a tube furnace at 400° C. for 20 hours, and a porous honeycombed nickel oxide microsphere product was collected, labeled as NiO-2, with a specific surface area of 135.6 m$^2$/g.

Example 3

0.263 g of nickel sulfate hexahydrate was dissolved in 30 mL of deionized water at ambient temperature to obtain a green clear solution, then 0.48 g of urea was added to the above solution, 6 mL of glycerol was added, and they were stirred to be uniform. The resulting mixture was transferred to a stainless steel autoclave lined with polytetrafluoroethylene, and subjected to a hydrothermal reaction at 140° C. for 1 hour. After the hydrothermal reaction was completed, the mixture was cooled to ambient temperature, and centrifuged to collect the green crude product. The green crude product was washed with deionized water and absolute ethanol for three times each, and dried at 60° C. in an oven for 12 hours, to obtain a green product. The green product was calcined at 400° C. in a tube furnace for 20 hours, and a porous honeycombed nickel oxide microsphere product was collected, labeled as NiO-3, with a specific surface area of 94.8 m$^2$/g.

Example 4

0.263 g of nickel sulfate hexahydrate was dissolved in 24 mL of deionized water at ambient temperature to obtain a green clear solution, then 0.48 g of urea was added to the above solution, 12 mL of glycerol was added, and they were stirred to be uniform. The resulting mixture was transferred to a stainless steel autoclave lined with polytetrafluoroethylene, and subjected to a hydrothermal reaction at 140° C. for 1 hour. After the hydrothermal reaction was completed, the mixture was cooled to ambient temperature, and centrifuged to collect a green crude product. The green crude product was washed with deionized water and absolute ethanol for three times each, and dried at 60° C. in an oven for 12 hours, to obtain a green product. The green product was calcined at 400° C. in a tube furnace for 20 hours, and a porous honeycombed nickel oxide microsphere product was collected, labeled as NiO-4, with a specific surface area of 96.3 m$^2$/g.

Example 5

0.263 g of nickel sulfate hexahydrate was dissolved in 18 mL of deionized water at ambient temperature to obtain a green clear solution, then 0.48 g of urea was added to the above solution, 18 mL of glycerol was added, and they were stirred to be uniform. The resulting mixture was transferred to a stainless steel autoclave lined with polytetrafluoroethylene, and subjected to a hydrothermal reaction at 140° C. for 1 hour. After the hydrothermal reaction is completed, the mixture was cooled to ambient temperature, and centrifuged to collect a green product. The green product was washed with deionized water and absolute ethanol for three times each, and dried at 60° C. in an oven for 12 hours, to obtain a green product. The green product was calcined at 400° C. in a tube furnace for 20 hours, and a porous honeycombed nickel oxide microsphere product was collected, labeled as NiO-5, with a specific surface area of 102.5 m$^2$/g.

Examples 6-10

This method was performed as described in Example 5, to prepare porous honeycombed nickel oxide microspheres, except that urea was used in the amount of 0.06 g, 0.12 g, 0.24 g, 0.48 g and 0.60 g respectively, and the finally-obtained products were labeled as NiO-U1 (Example 6), NiO-U2 (Example 7), NiO-U3 (Example 8), NiO-U4 (Example 9), NiO-U5 (Example 10); among them, Example 9 was equivalent to Example 5, that is to say, the product NiO-U4 was the same as the product NiO-5.

The structure and morphology of the products obtained in the present disclosure were tested. The morphology was characterized on the Verios G4 field emission scanning electron microscope purchased from FEI Company of the United States. The crystal phase structure was characterized on the X'Pert Pro MPD powder X-ray diffractometer purchased from PANalytical Company of Netherlands. The porous structure was characterized on the TriStar II 3020 type nitrogen adsorption-desorption analyzer purchased from micromeritics instruments corporation of the United States. The results are shown in FIGS. 1 to 4.

FIG. 1 shows SEM images of the porous honeycombed nickel oxide microspheres as prepared in Examples 1 to 5, in which (a) and (b) show SEM images of the porous honeycombed nickel oxide microspheres as prepared in Example 1 at different magnifications, (c) and (d) show SEM images of the porous honeycombed nickel oxide microspheres as prepared in Example 2 at different magnifications, and (e) and (f) show SEM images of porous honeycombed nickel oxide microspheres as prepared in Example 3 at different magnifications, (g) and (h) show SEM images of porous honeycombed nickel oxide microspheres as prepared in Example 4 at different magnifications, (i) and (j) show SEM images of the porous honeycombed nickel oxide microspheres as prepared in Example 5 at different magnifications. It can be seen from FIG. 1 that with variations of the amount of glycerol in the reaction system, the particle size of the microsphere is controllable in a range of 1.5-5 μm, and the microspheres exhibit a good monodispersity.

Figure 2:
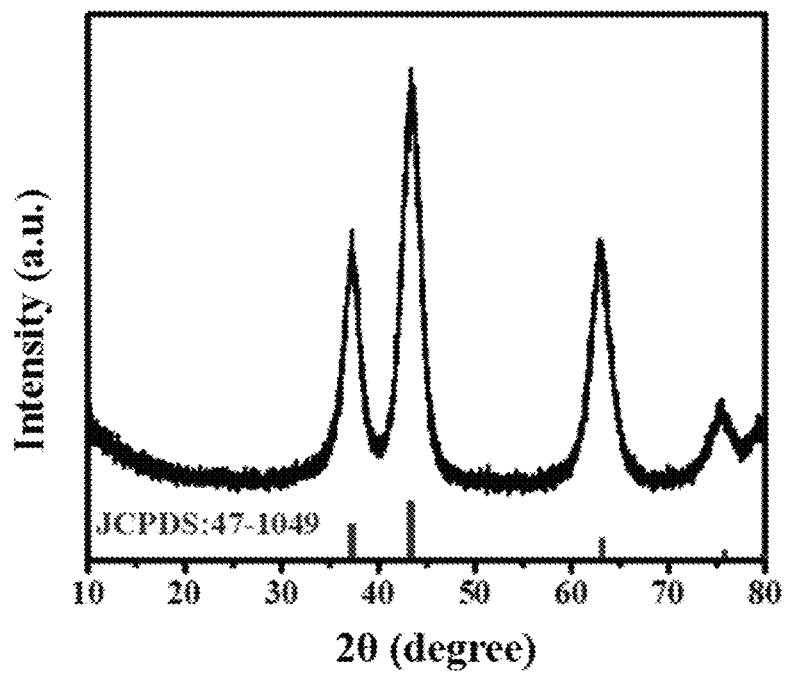
FIG. 2 shows an X-ray diffraction (XRD) pattern of the hierarchical porous honeycombed nickel oxide microspheres as prepared in Example 5.

FIG. 2 shows an X-ray diffraction (XRD) pattern of the hierarchical porous honeycombed nickel oxide microspheres as prepared in Example 5. It can be seen from the pattern that the product exhibit characteristic peaks completely corresponding to those of the standard card of cubic NiO (JCPDS card No. 47-1049), and exhibit main peaks at 2θ=37.2°, 43.2° and 62.8°, which corresponds to (111), (200) and (220) crystal planes, respectively, indicating that the resulting micro/nano material is pure NiO, without other impurities.

Figure 3:
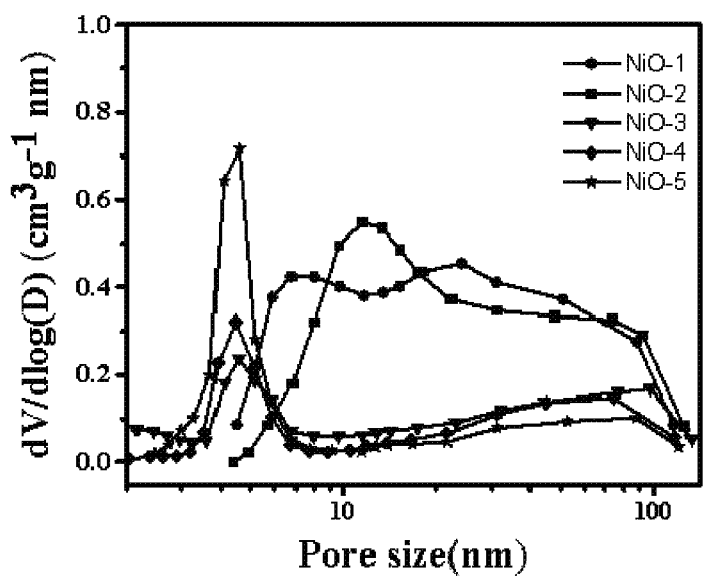
FIG. 3 shows pore size distribution diagrams of the hierarchical porous honeycombed nickel oxide microspheres (NiO-X, X=1, 2, 3, 4, 5) as prepared in Examples 1 to 5, as measured by the nitrogen adsorption-desorption method.

FIG. 3 shows pore size distribution diagrams of the hierarchical porous honeycombed nickel oxide microspheres (NiO-X, X=1, 2, 3, 4, 5) as prepared in Examples 1 to 5, as measured by the nitrogen adsorption-desorption method. It can be clearly seen that, under the condition that glycerol is not added or glycerol is added in a small amount, the pore size distribution is broad and exhibits bimodal situation; under the condition that the amount of glycerol is gradually increased, the peak located at the smaller pore size site shifts to the direction of smaller pore size, and the pore size distribution narrows, indicating that the pore size becomes more uniform, while the intensity of the other peak located at a larger pore size site is gradually decreased. It can be seen from these results that glycerol can be used as an effective pore-size controlling agent. Meanwhile, it can be seen from the SEM images of FIG. 1 that glycerol can be to simultaneously control the particle size of the porous honeycombed nickel oxide microspheres.

Figure 4:
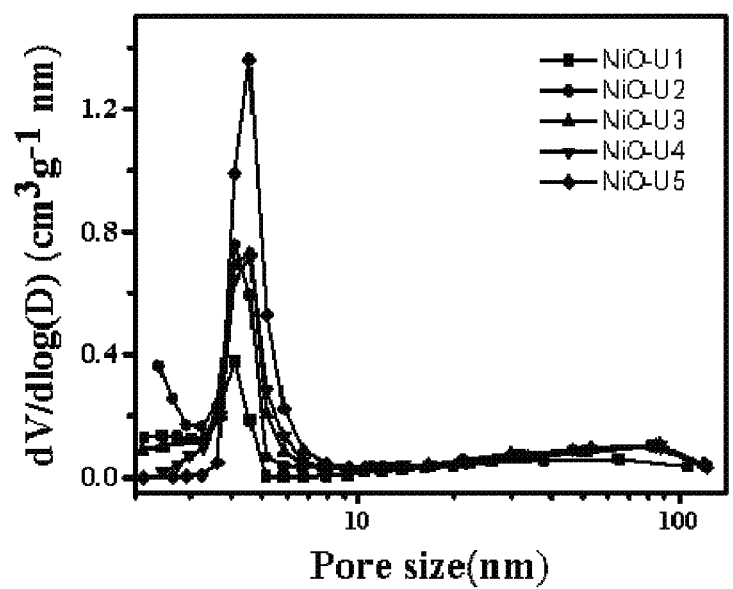
FIG. 4 shows pore size distribution diagrams of the nickel oxide microspheres (NiO-UX, X=1, 2, 3, 4, 5) as prepared in Examples 6 to 10, as measured by the nitrogen adsorption-desorption method.

FIG. 4 shows pore size distribution diagrams of the nickel oxide microspheres (NiO-UX, X=1, 2, 3, 4, 5) as prepared in Examples 6-10, as measured by the nitrogen adsorption-desorption method. As the content of urea in the reaction system is increased, the intensity of the mesoporous peak gradually increases, and the mesoporous peak is narrow and sharp, indicating that the pore size is more uniform.

It can be seen from the above examples that the present disclosure provides a hierarchical porous honeycombed nickel oxide microsphere and a preparation method thereof. By controlling the amount of glycerol and the amount of urea, it is possible to control the particle size of the honeycombed nickel oxide microsphere and its porous structure. The hierarchical porous honeycombed nickel oxide microspheres as prepared in the present disclosure are expected to exhibit excellent performances in the fields of catalysis, energy, adsorption and separation, gas sensing and the like.

The above descriptions are only preferred embodiments of the present disclosure, and would not limit the present disclosure in any way. It should be noted that for those skilled in the art, without departing from the principle of the present disclosure, several improvements and modifications could be made, and these improvements and modifications should also be within the protection scope of the present disclosure.

What is claimed is:

1. A method for preparing a hierarchical porous honeycombed nickel oxide microsphere, comprising,
   mixing nickel sulfate hexahydrate, urea, water and glycerol, to obtain a mixed solution, wherein a mass ratio of nickel sulfate hexahydrate to urea is in the range of (0.24-0.28):(0.06-0.60), a volume ratio of glycerol to water is in the range of (0-18):(36-18), and a ratio of the total solid mass of nickel sulfate hexahydrate and urea to the total liquid volume of glycerol and water is in the range of 1 g:(40-110) mL;
   subjecting the mixed solution to a hydrothermal reaction, to obtain a precursor, wherein the hydrothermal reaction is performed at a temperature of 135-140° C. for 40-80 minutes; and
   calcining the precursor, to obtain the hierarchical porous honeycombed nickel oxide microspheres.

2. The method as claimed in claim 1, wherein the volume ratio of glycerol to water is 1:35, 1:5, 1:2 or 1:1.

3. The method as claimed in claim 1, wherein the calcining of the precursor is performed at a temperature of 400-450° C. for 20-24 hours.

4. The method as claimed in claim 1, further comprising subjecting a product obtained after the hydrothermal reaction to a filtering, a washing and a drying in sequence.

5. The method as claimed in claim 1, wherein the mixing of nickel sulfate hexahydrate, urea, water and glycerol is performed at a temperature of 15-35° C.

* * * * *